Patented Mar. 8, 1949

2,463,869

UNITED STATES PATENT OFFICE 2,463,869

MIXED ALLYL ETHERS OF STARCH

Robert M. Hamilton and Elias Yanovsky, Philadelphia, Pa., assignors to the United States of America as represented by the Secretary of Agriculture No Drawing. Application March 25, 1946, Serial No. 656,952

2 Claims. (Cl. 260—209)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to ethers of starch, and is an improvement of the invention disclosed in the copending application, Serial No. 518,976, filed January 20, 1944, now Patent No. 2,406,369. In general, according to the invention disclosed in the above identified application, starch is etherified by heating an acylated starch dissolved in acetone with an allyl halide in the presence of aqueous caustic alkali. In this manner, the starch acetate is simultaneously de-acetylated and etherified with allyl groups and an organic-soluble allyl ether of starch is obtained.

While allyl ether of starch so prepared is soluble in a large number of organic solvents, it is not soluble in the cheap aliphatic hydrocarbons. Another disadvantage is its somewhat poor resistance to water, due to its free hydroxyl group content resulting from incomplete etherification.

These disadvantages are overcome, according to the present invention, by the introduction in addition to the allyl groups present in the allyl ether of starch of other hydrocarbon ether groups, such as alkyl groups, for example: methyl, ethyl, propyl, butyl, amyl, hexyl, heptyl, lauryl, and others, or unsaturated groups such as vinyl, crotyl or isocrotyl, or aryl groups such as benzyl or cinnamyl. This is accomplished by partially etherifying the hydroxyl groups of starch with a halide of the ether group desired as an etherifying agent, and then treating the partially etherified starch thus obtained with an allyl halide to etherify the other hydroxyl groups.

As a typical example, the preparation of heptyl-allyl ether of starch is described in detail. The reaction was carried out in a three-neck liter flask fitted with a mechanical stirrer and reflux condenser. The flask was heated in a temperature controlled oil bath. Temperatures given below are those of the bath. The process was carried out in four steps, indicated as (a), (b), (c), and (d) below.

(a) To 20 g. of dry starch slurried in 300 g. water for half an hour at room temperature, 100 g. of 40% sodium hydroxide solution was added and the mixture heated for half an hour at 65° C. with rapid stirring to break down the starch gel.

(b) To the resulting clear paste, 115 g. of solid sodium hydroxide and 20.9 g. of heptyl iodide were added, and the mixture was heated with continuous stirring for one hour at 95° C.

(c) Additional amounts of sodium hydroxide (240 g.) and heptyl iodide (20.9 g.) were added, and the temperature raised to 105° C. for two hours, then to 118° C. for three hours. The reaction mixture was cooled and neutralized with 50% acetic acid, and the precipitate filtered and washed with hot water, then dried in vacuo for five hours at 40° C.

The resulting product had a substitution of 1.7 heptyl groups per glucose unit.

(d) Ten g. of the heptyl ether of starch thus produced was dissolved in 50 cc. of methyl ethyl ketone, 40 g. of 50% sodium hydroxide solution and 100 g. of allyl bromide were added, and the mixture heated under reflux for six hours with constant stirring.

The solvent and excess allyl bromide were then removed by steam distillation and the resulting gummy product washed with warm water until free of formed salt.

The heptyl-allyl mixed ether of starch thus produced was shown by analysis to contain 1.7 heptyl groups and 1.4 allyl groups per glucose unit.

The compositions of the mixed ethers may be varied greatly by using different amounts of the heptyl iodide in steps (b) and (c), the remaining hydroxyl groups being then allylated by the method described in step (d). Thus, for example, ethers of the composition shown in the following table may be prepared following the procedure above outlined except for variation in the amounts of heptyl iodide used.

| Grams of heptyl iodide | | Heptyl groups per glucose unit | Allyl groups per glucose unit |
|---|---|---|---|
| Step (b) | Step (c) | | |
| 10.5 | None | 0.5 | 2.4 |
| 20.9 | None | 0.8 | 2.3 |
| 31.4 | None | 0.9 | 2.2 |
| 41.8 | 41.8 | 2.6 | 0.4 |

According to another process of preparing the mixed ethers, the starch is treated with an alkyl halide and then, without isolating the product, with an allyl halide, the treatment being carried out as described in steps (a), (b) and (c) above, the bath temperature being then lowered to 80° C., allyl bromide being then added, and the temperature and stirring being maintained for six hours.

The product is then isolated as described in step (d).

In this manner, a butyl-allyl mixed ether of starch was prepared by using 12.5 g. of butyl iodide in steps (b) and (c) and then, without isolating the product, adding 100 g. of allyl bromide.

The resulting butyl-allyl ether of starch contained 1.4 allyl groups and 1.6 butyl groups per glucose unit.

Hexyl-allyl ether of starch prepared in a similar manner using 100 g. of hexyl iodide in steps (b) and (c), and then 100 g. of allyl bromide, had a substitution of 1.7 hexyl and 1.3 allyl groups per glucose unit.

The mixed ethers of starch prepared by the processes indicated above have substantially all of the hydroxyl groups etherified. They produce lacquers of better water resistance than lacquers prepared from allyl starch of the type disclosed in the copending application. While soluble in a large variety of organic solvents, including cheap aliphatic hydrocarbons such as gasoline, petroleum ether and kerosene, a solution of the mixed allyl ethers of starch, when applied by brushing, spraying or spreading, to smooth, fibrous and porous surfaces, such as wood, metal, leather or glass, leaves a film which, after setting at elevated temperature or even at room temperature, particularly in the presence of catalysts, such as cobalt naphthenate, e. g., polymerizes and is thereafter insoluble in organic solvents. The film is unaffected by acids or alkalies of moderate concentrations and is fairly resistant toward heat (to 350° F.).

As further examples, the following mixed ethers were prepared. They contain no free hydroxyl groups, are soluble in aliphatic hydrocarbons, but when set in films are no longer so soluble:

Butyl-allyl ether of starch containing 1.5 butyl and 1.5 allyl groups per glucose unit Hexyl-allyl ether of starch containing 1.0 hexyl and 2.0 allyl groups per glucose unit Lauryl-allyl ether of starch containing 0.8 lauryl and 2.2 allyl groups per glucose unit

Having thus described the invention, what is claimed is:

1. An ether of starch containing from 0.4 to 2.4 allyl groups per glucose unit the balance of the hydroxyl groups of which are etherified with heptyl groups.

2. An ether of starch containing from 0.4 to 2.4 allyl groups per glucose unit the balance of the hydroxyl groups of which are etherified with hydrocarbon groups other than allyl.

ROBERT M. HAMILTON.
ELIAS YANOVSKY.

REFERENCES CITED

The following references are of record in the file of this patent:

UNITED STATES PATENTS

| Number | Name | Date |
| --- | --- | --- |
| 1,350,820 | Lilienfeld | Aug. 24, 1920 |
| 1,504,178 | Young | Aug. 5, 1924 |
| 2,082,797 | Hahn | June 8, 1937 |
| 2,102,205 | Haskins | Dec. 14, 1937 |
| 2,134,086 | Maxwell | Oct. 25, 1938 |
| 2,336,985 | Freund | Dec. 14, 1943 |